(12) United States Patent
Meredith et al.

(10) Patent No.: US 9,813,900 B2
(45) Date of Patent: *Nov. 7, 2017

(54) MOTION-BASED USER INTERFACE FEATURE SUBSETS

(71) Applicants: AT&T Mobility II LLC, Atlanta, GA (US); AT&T Intellectual Property I, L.P., Atlanta, GA (US)

(72) Inventors: Sheldon Meredith, Marietta, GA (US); Muayyad Mustafa, Duluth, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/641,242

(22) Filed: Mar. 6, 2015

(65) Prior Publication Data

US 2015/0189502 A1 Jul. 2, 2015

Related U.S. Application Data

(63) Continuation of application No. 12/958,146, filed on Dec. 1, 2010, now Pat. No. 9,009,629.

(51) Int. Cl.
*G06F 3/048* (2013.01)
*H04W 8/24* (2009.01)
(Continued)

(52) U.S. Cl.
CPC ............ *H04W 8/245* (2013.01); *G06F 3/01* (2013.01); *H04W 4/02* (2013.01)

(58) Field of Classification Search
CPC combination set(s) only.
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Office Action dated Nov. 16, 2015 for U.S. Appl. No. 13/188,136, 31 pages.

(Continued)

*Primary Examiner* — Hien Duong
(74) *Attorney, Agent, or Firm* — Amin, Turocy & Watson, LLP

(57) ABSTRACT

Motion adaptive user equipment (UE) in a wireless communications network environment adapted for selecting one or more subsets of accessible user interface (UI) functions based, at least in part, on the determined motion of a UE, is disclosed. By selectively employing the one or more subsets of UI functions, a UE can dynamically adapt to the motion of the UE and limit distracting interactions with the UE creating a safer or more compliant wireless environment. Further disclosed are features related to override of UI limitations, auxiliary location sensing aspects, motion rule updating features, and voluntary and involuntary user preference aspects.

20 Claims, 14 Drawing Sheets

(51) Int. Cl.
*G06F 3/01* (2006.01)
*H04W 4/02* (2009.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Chrichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,008,684 B2 | 4/2015 | Tipton et al. |
| 9,008,698 B2 | 4/2015 | Meredith et al. |
| 9,232,399 B2 | 1/2016 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |

(56) References Cited

U.S. PATENT DOCUMENTS

| | | |
|---|---|---|
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1* | 2/2008 | Patel ................ H04W 4/18 455/456.1 |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1* | 10/2010 | Bull ................ G01S 5/02 455/456.1 |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1* | 3/2011 | Wigren ................ G01S 5/0252 455/456.5 |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |

(56) References Cited

U.S. PATENT DOCUMENTS

| | | | |
|---|---|---|---|
| 2011/0287801 A1 | 11/2011 | Levin et al. | |
| 2011/0296169 A1 | 12/2011 | Palmer | |
| 2011/0319098 A1 | 12/2011 | Potorny et al. | |
| 2012/0016902 A1 | 1/2012 | Ranjan et al. | |
| 2012/0025976 A1 | 2/2012 | Richey et al. | |
| 2012/0028650 A1 | 2/2012 | Cooper et al. | |
| 2012/0030083 A1 | 2/2012 | Newman et al. | |
| 2012/0032855 A1 | 2/2012 | Reede et al. | |
| 2012/0052883 A1 | 3/2012 | Austin et al. | |
| 2012/0052884 A1 | 3/2012 | Bogatin | |
| 2012/0062415 A1 | 3/2012 | Hwang et al. | |
| 2012/0087338 A1 | 4/2012 | Brandt et al. | |
| 2012/0099621 A1* | 4/2012 | Karlsson | H04W 72/048 375/148 |
| 2012/0115505 A1 | 5/2012 | Miyake et al. | |
| 2012/0139782 A1 | 6/2012 | Gutt et al. | |
| 2012/0144452 A1 | 6/2012 | Dyor et al. | |
| 2012/0144457 A1 | 6/2012 | Counterman | |
| 2012/0158289 A1 | 6/2012 | Bernheim Brush et al. | |
| 2012/0182180 A1 | 7/2012 | Wolf et al. | |
| 2012/0182874 A1 | 7/2012 | Siomina et al. | |
| 2012/0185309 A1 | 7/2012 | Kakarla et al. | |
| 2012/0214509 A1 | 8/2012 | Levin et al. | |
| 2012/0221232 A1 | 8/2012 | Shang et al. | |
| 2012/0253656 A1 | 10/2012 | Brandt | |
| 2012/0287911 A1 | 11/2012 | Takano et al. | |
| 2012/0302254 A1 | 11/2012 | Charbit et al. | |
| 2012/0317500 A1 | 12/2012 | Kosseifi et al. | |
| 2012/0323703 A1 | 12/2012 | Hillier et al. | |
| 2012/0327869 A1 | 12/2012 | Wang et al. | |
| 2013/0007058 A1 | 1/2013 | Meredith et al. | |
| 2013/0023237 A1 | 1/2013 | Meredith et al. | |
| 2013/0023247 A1 | 1/2013 | Bolon et al. | |
| 2013/0023274 A1 | 1/2013 | Meredith et al. | |
| 2013/0023281 A1 | 1/2013 | Meredith et al. | |
| 2013/0053057 A1 | 2/2013 | Cansino et al. | |
| 2013/0066748 A1 | 3/2013 | Long | |
| 2013/0095861 A1 | 4/2013 | Li et al. | |
| 2013/0096966 A1 | 4/2013 | Barnes | |
| 2013/0109407 A1 | 5/2013 | Tipton et al. | |
| 2013/0114464 A1 | 5/2013 | Tarraf et al. | |
| 2013/0122863 A1 | 5/2013 | Chen et al. | |
| 2013/0137464 A1 | 5/2013 | Kramer et al. | |
| 2013/0226451 A1 | 8/2013 | O'Neill et al. | |
| 2013/0281111 A1 | 10/2013 | Syrjarinne et al. | |
| 2013/0288704 A1 | 10/2013 | Wirola et al. | |
| 2013/0310075 A1 | 11/2013 | Lim et al. | |
| 2013/0324149 A1 | 12/2013 | Fix et al. | |
| 2013/0337824 A1 | 12/2013 | Meredith et al. | |
| 2013/0337826 A1 | 12/2013 | Fix et al. | |
| 2014/0062782 A1 | 3/2014 | Abraham | |
| 2014/0106779 A1 | 4/2014 | Arslan et al. | |
| 2014/0122220 A1 | 5/2014 | Bradley et al. | |
| 2014/0171060 A1 | 6/2014 | Cook et al. | |
| 2014/0278744 A1 | 9/2014 | Lo Faro et al. | |
| 2014/0295881 A1 | 10/2014 | Werner et al. | |
| 2015/0011249 A1 | 1/2015 | Siliski et al. | |

FOREIGN PATENT DOCUMENTS

| | | | |
|---|---|---|---|
| JP | 2004069609 A | 3/2004 | |
| JP | 2005091303 A | 4/2005 | |
| JP | 2007328050 A | 12/2007 | |
| WO | WO2006031035 A1 | 3/2006 | |

OTHER PUBLICATIONS

"Error", The American Heritage(R) Dictionary of the English Language, 2011, Houghton Mifflin Company, Boston, MA, 2 pages. Retrieved from [http://search.credoreference.com/contententry/hmdictenglang/error/O] on Nov. 16, 2015.

Office Action dated Nov. 23, 2015 for U.S. Appl. No. 14/520,287, 80 pages.

Office Action dated Nov. 16, 2015 for U.S. Appl. No. 14/566,657, 87 pages.

Office Action mailed Nov. 30, 2015 for U.S. Appl. No. 13/447,072, 45 pages.

Office Action mailed Dec. 18, 2015 for U.S. Appl. No. 14/548,901, 35 pages.

Office Action mailed Dec. 31, 2015 for U.S. Appl. No. 14/952,609, 32 pages.

Office Action mailed Dec. 1, 2015 for U.S. Appl. No. 13/526,988, 43 pages.

Office Action dated Jan. 11, 2016 for U.S. Appl. No. 13/175,199, 29 pages.

Office Action dated Sep. 30, 2016 for U.S. Appl. No. 14/957,525, 72 pages.

Notice of Allowance mailed Oct. 7, 2016 for U.S. Appl. No. 14/548,901, 45 pages.

Office Action dated Oct. 12, 2016 for U.S. Appl. No. 14/877,915, 34 pages.

Notice of Allowance mailed Nov. 16, 2016 for U.S. Appl. No. 15/186,410, 80 pages.

Office Action dated Dec. 28, 2016 for U.S. Appl. No. 13/447,072, 34 pages.

Notice of Allowance mailed Aug. 12, 2013, for U.S. Appl. No. 13/174,541, 40 pages.

Final Office Action dated Aug. 2, 2013, for U.S. Appl. No. 13/188,295, 26 pages.

Final Office Action dated Aug. 2, 2013, for U.S. Appl. No. 13/188,300, 38 pages.

Non-Final Office Action dated Jun. 20, 2013, for U.S. Appl. No. 13/219,911, 61 pages.

Non-Final Office Action dated Jul. 17, 2013, for U.S. Appl. No. 13/188,345, 27 pages.

Non-Final Office Action dated Jun. 20, 2013, for U.S. Appl. No. 13/291,917, 52 pages.

Non-Final Office Action dated May 31, 2013, for U.S. Appl. No. 13/523,770, 40 pages.

Non-Final Office Action dated Sep. 19, 2013, for U.S. Appl. No. 13/927,020, 30 pages.

Non-Final Office Action dated Oct. 2, 2013 for U.S. Appl. No. 12/958,146, 31 pages.

Non-Final Office Action dated Sep. 26, 2013 for U.S. Appl. No. 13/284,456, 58 pages.

RouteFinder 3.00 for ArGIS Documentation, 2007, Routeware and Higher Mapping Solutions, 71 pages, downloaded from http://www.routeware.dk/download/routefinder_arcgis.pdf.

mySociety (Web page), "More travel-time maps and their uses", 2007, downloaded from http://www.mySociety.org/2007/more-travel-maps/, 10 pages total (including a single page Examiner's attachment showing the operation of the interactive travel-time map).

Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.

Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.

Non-Final Office Action dated Nov. 5, 2013 for U.S. Appl. No. 13/188,136, 47 pages.

Final Office Action dated Sep. 18, 2013, for U.S. Appl. No. 13/284,497, 30 pages.

Final Office Action dated Aug. 22, 2013, for U.S. Appl. No. 13/277,595, 36 pages.

Final Office Action dated Oct. 21, 2013, for U.S. Appl. No. 13/523,770, 24 pages.

Office Action dated Nov. 5, 2013 for U.S. Appl. No. 13/188,345, 30 pages.

Non-Final Office Action dated Dec. 11, 2013, for U.S. Appl. No. 13/188,295, 52 pages.

Non-Final Office Action dated Dec. 24, 2013, for U.S. Appl. No. 13/188,300, 44 pages.

(56) References Cited

OTHER PUBLICATIONS

Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN lu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, TIMO Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Feb. 13, 2015 for U.S. Appl. No. 13/188,136, 44 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Apr. 16, 2015 for U.S. Appl. No. 14/521,431, 82 pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.

(56) References Cited

OTHER PUBLICATIONS

Office Action dated Jun. 2, 2015 for U.S. Appl. No. 14/516,286, 20 pages.
Office Action dated May 20, 2015 for U.S. Appl. No. 13/526,988, 52 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholargoogle.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system. Retrieved on Aug. 15, 2011, 7 pages.
Koukoumidis, et al., "SignalGuru: Leveraging Mobile Phones for Collaborative Traffic Signal Schedule Advisory." MobiSys'11, Jun. 28-Jul. 1, 2011, Bethesda, Maryland, USA, Copyright 2011 ACM 978-1-4503-0643-0/11/06. Retrieved on Nov. 19, 2011, 14 pages.
Bitcarrier Technology. Published online at http://www.bitcarrier.com/technology. Retrieved on Aug. 15, 2011, 1 page.
Hao, et al., "Estimating Vehicle Position in a Queue at Signalized Intersections Using Simple Travel Times from Mobile Sensors." Retrieved on Nov. 19, 2011, 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Notice of Allowance dated Aug. 27, 2015 for U.S. Appl. No. 14/521,431, 39 Pages.

(56) References Cited

OTHER PUBLICATIONS

Notice of Allowance dated Jul. 8, 2015 for U.S. Appl. No. 14/548,901, 125 pages.
Buford, et al., Location Privacy Enforcement in a Location-Based Services Platform, IEEE, 2009, 978-1-4244-2309-5/09/$25.00 ©2009 IEEE. Retrieved on Jul. 29, 2015, 5 pages.
Philips, Jr. et al., Information Sharing and Security in Dynamic Coalitions, ACM, 2002. Retrieved on Jul. 29, 2015, 10 pages.
Moniruzzaman, et al., "A Study of Privacy Policy Enforcement in Access Control Models", Proceedings of 13th International Conference on Computer and Information Technology (ICCIT 2010), ©2010 IEEE. Retrieved on Jul. 29, 2015, 6 pages.
Office Action dated Jul. 22, 2015 for U.S. Appl. No. 13/188,136, 31 pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 pages.
Office Action dated Jun. 9, 2015 for U.S. Appl. No. 13/495,756, 35 pages.
Office Action mailed Mar. 11, 2016 for U.S. Appl. No. 14/743,076, 86 pages.
Notice of Allowance mailed Mar. 16, 2016 for U.S. Appl. No. 14/520,287, 23 pages.
Office Action mailed Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21st century dictionary. Retrieved on May 9, 2014 from http://search.credoreference.com/content/entry/chambdict/represent/O.
Represent. (2011). In The american heritage dictionary of the english language. Retrieved on May 9, 2014 from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Feb. 27, 2017 for U.S. Appl. No. 15/132,220, 91 pages.
Office Action dated Jan. 26, 2017 for U.S. Appl. No. 14/877,915, 20 pages.
Office Action dated Jan. 13, 2017 for U.S. Appl. No. 14/601,800, 95 pages.
Office Action dated Feb. 15, 2017 for U.S. Appl. No. 15/191,877, 104 pages.
Notice of Allowance dated Apr. 10, 2017 for U.S. Appl. No. 14/676,066, 33 pages.
Office Action dated Jun. 12, 2017 for U.S. Appl. No. 15/132,220, 25 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Office Action dated Jun. 19, 2017 for U.S. Appl. No. 13/447,072, 47 pages.
Office Action dated Jul. 5, 2017 for U.S. Appl. No. 15/191,877, 32 pages.
Office Action dated Jul. 25, 2017 for U.S. Appl. No. 15/422,147, 86 pages.
Office Action dated Aug. 24, 2017 for U.S. Appl. No. 14/881,335, 125 pages.
Notice of Allowance dated Aug. 16, 2017 for U.S. Appl. No. 14/877,915, 63 pages.

* cited by examiner

MOTION-BASED USER INTERFACE FEATURE SUBSETS

CROSS-REFERENCE TO RELATED APPLICATIONS

This application is a continuation of, and claims priority to, U.S. patent application Ser. No. 12/958,146, titled, "MOTION-BASED USER INTERFACE FEATURE SUBSETS", and filed 1 Dec. 2010, now issued as U.S. Pat. No. 9,009,629, which is hereby incorporated by reference in its entirety.

TECHNICAL FIELD

The present application relates generally to wireless communications networks, and more particularly, to motion adaptive user equipment (UE) in a wireless communications network environment adapted for selecting one or more subsets of accessible user interface (UI) functions based, at least in part, on a determined motion of a UE.

BACKGROUND

In wireless communications networks, modern wireless communication devices, e.g., user equipment (UE), provide users more access to interesting and useful applications and functions than ever before. While this can be a huge benefit to a user, it can also contribute to distracting a user from important tasks at hand. For example, where a user, as a driver, is employing a cell phone or other mobile device in a vehicle, certain interactions with the user equipment can contribute to the distraction of the user that can endanger the user or other drivers. However, in contrast, where the user, as a passenger, is employing a cell phone or other mobile device and a vehicle, the same interactions with the user equipment may contribute to a dangerous condition for the user or other drivers.

Traditional systems for determining if user equipment is in motion commonly rely on the detection of motion in systems other than the user equipment. For example, speed sensors in the wheels of vehicles may be employed to determine the motion of a vehicle, and hence the motion of a user equipment inside the vehicle. However, this requires each user equipment to interface with each vehicle speed sensing system in a relatively seamless manner. This can be burdensome where there may be no set interface standard. Other traditional systems for determining if user equipment is in motion can be burdened by other technological difficulties. For example, an assisted global positioning system (AGPS) can be employed to determine the position of an AGPS detector, which can be co-located with a user equipment, to determine the position of user equipment. However, determining the position of the GPS detector can be power intensive, decreasing battery life for the mobile device. Further, AGPS capability is widely acknowledged to have substantial limitations resulting from geography, topology, or other forms of timing signal interference, such as building reflection, etc. These traditional systems, thus, often do not provide adequate information as to the relative movement of user equipment or can be overly taxing on the resources of the user equipment. As such, traditional systems often do not provide satisfactory results for motion detection.

Despite these limitations in effective and efficient motion detection for conventional motion detection systems, wireless carriers have attempted to limit or disable user equipment functionality based on UE motion. The results have been generally unsatisfactory as is evidenced by a lack of widely available wireless products that limit or defeat user access to the mobile device while the user device is in motion. Improvements to motion detection of UEs can lead to desirable improvements in limiting the use of mobile equipment in compliance with safety standards, ordinances, or conditions.

The above-described deficiencies of traditional motion sensing systems for wireless communications technologies are merely intended to provide an overview of some of the problems of conventional systems, and are not intended to be exhaustive. Other problems with conventional systems and corresponding benefits of the various non-limiting embodiments described herein may become further apparent upon review of the following description.

DETAILED DESCRIPTION

Figure 1:
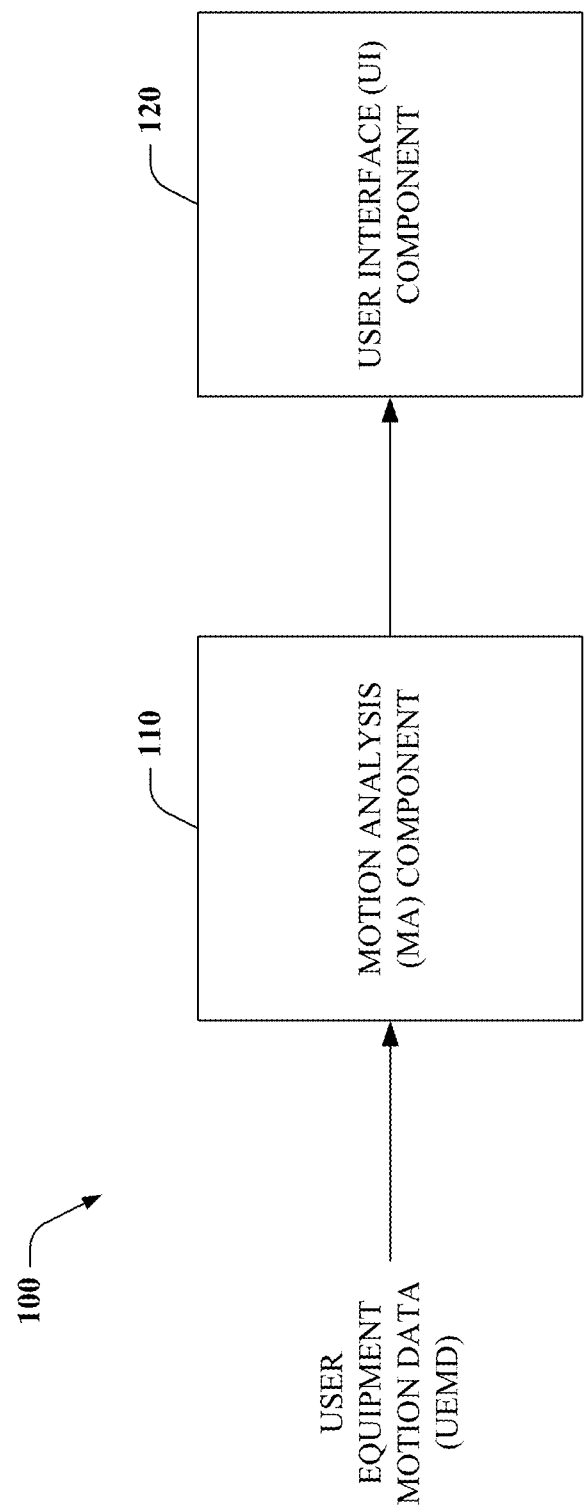
FIG. 1 is a block diagram illustrating a system that can determine motion-based user interface feature subsets in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

One or more embodiments of the disclosed subject matter comprise a motion analysis component that can be configured to access user equipment (UE) motion data. The motion analysis component can be further configured to analyze the UE motion data to determine at least one subset of accessible user interface functions. As such, a user interface component can be configured to access the subset of accessible user interface functions. This can result in different UI functionality being accessible based on the motion of a UE.

In another non-limiting aspect, methods can be employed accessing UE motion data and determining UE motion based on the UE motion data. Further, these methods can facilitate determining at least one subset of accessible user interface functions based, at least in part, on the UE motion.

Aspects, features, or advantages of the various embodiments of the subject disclosure can be exploited in wireless telecommunication devices, systems or networks. Non-limiting examples of such devices or networks include Femtocell technology, Wi-Fi, e.g., various 802.xx technologies, etc., Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); LTE Advanced, femtocell(s), microcell(s), Bluetooth, etc. Additionally, aspects of the disclosed subject matter can include legacy telecommunication technologies.

FIG. 1 is a block diagram illustrating a system 100 that can determine motion-based user interface feature subsets in accordance with aspects of the disclosed subject matter. System 100 can include motion analysis (MA) component 110. MA component 110 can access user equipment motion data (UEMD). UEMD can be data related to the motion of user equipment (UE).

In an aspect, UEMD data can include UE location data as disclosed in related application U.S. Ser. No. 12/712,424, incorporated herein by reference in its entirety. Similarly, UEMD data can include location data as disclosed in related application U.S. Ser. No. 12/836,471, incorporated herein by reference in its entirety. As such, UEMD data can include timed fingerprint locating (TFL) or TFL for idle-state UEs as disclosed in the related applications. The accuracy of TFL and TFL for idle-state UEs provides an improved ability to measure movement over more conventional methods. For example, TFL and TFL for idle-state UEs can provide more accurate speed measurements (change in location over time) than AGPS over a wider range of geographic/topographic conditions (as disclosed in the referenced applications). As a second example, TFL and TFL for idle-state UEs can provide for easier implementation and higher confidence as compared to more conventional systems such as speed sensors in a vehicle where the location measurement is for the UE itself rather than being associated with a vehicle, especially where the UE can move through a variety of vehicles that can present significant handshake issues, correlation issues, etc.

Generally, for TFL data and TFL for idle-state data, a given propagation delay, B, can be determined for location aware UEs within a TFL wireless environment. Further, cell site delay, A, can be initially determined where an observed UE time difference, C, is also available by subtracting the propagation delay, B, from the observed UE time difference, C, (e.g., $A=C-B$). Cell site delay, A, is generally stable over periods of hours to days. Assuming A is relatively stable, B can be determined for C values (e.g., $B=C-A$). Wherein UEs (e.g., both location enabled and non-location enabled UEs) can make time data (e.g., an observed UE time difference, C) available, for example by transmitting it wirelessly, the propagation delay for most or all UEs can be determined with a simple calculation, given a determined A value. Further, given that the propagation delay, B, is essentially proportional to distance (e.g., B*speed of light=distance), the propagation delay, B, can be employed to determine a region of probable locations for a UE at a set distance from the related NodeB for which the propagation delay was measured. This can provide a centroid region in which the UE is likely to be located. TFL data and TFL for idle-state data can thus provide for computation of UE position and, as such, UE motion wherein UE motion can be a change in UE position over time.

MA component 110 can analyze UEMD to determine compliance with one or more motion rules. These motion rules can be related to the use of the UE while the UE is in motion. In an aspect, MA component 110 can determine one or more subsets of user interface (UI) functions that can be accessed for a given UE motion condition. As a non-limiting example, a rule can be that the keypad on a UE can accept only "9-1-1" key sequences while the UE is traveling at more than 15 miles per hour (MPH). As a second non-limiting example, a rule can be that the "ON" button of a UE cannot be activated for 60 seconds after a UE drops below 5 MPH after having descended from more than 2000 feet of vertical elevation in a pattern associated with the glide path of a common carrier aircraft. It will be appreciated by one of skill in the art that the terms rule, directive, goal, preference, argument, policy, etc. can be interchangeably used without departing from the scope of the presently disclosed subject matter and that all such permutations are within the present scope of the subject matter wherein the term "rule" is employed simply to provide concise and clear disclosure without any intention of being strictly limiting.

In an aspect, MA component 110 can analyze UEMD to determine UE motion. UE motion can include the position, speed, acceleration, velocity, direction, magnitude, etc. of a UE. As such, UEMD can be used to map the motion of a UE in two dimensions, e.g., motion on or near the surface of the earth, or three dimensions, e.g., motion above (or below) the surface of the earth, for example, by plane, gondola, helicopter, etc. UE motion analysis can facilitate limiting the functionality of the UI based, at least in part, on the motion. In an aspect, motion can include instantaneous motion and historical motion. Further, motion can include predictive motion, or anticipated motion, such as anticipating motion based on inference, etc. Moreover, motion can be classified, wherein a motion class can be employed to represent motions that fall into broader classes, as non-limiting examples: a vehicular motion class comprising car, bus, motorcycle, tram, trolley, or other similar motions; a high speed motion class comprising plane, high speed train, etc., a pedestrian class comprising walking, bicycling, escalator, elevator, etc.

UE motion can be applied to the motion rules by MA component 110 to form a determination of subsets of UI features that can be made accessible through the UE. Subset information can be accessed by UI component 120. As such, UI functionality can be adapted to the motion of a UE. As a non-limiting example, a parcel delivery corporation can have a policy that company issued UEs can only display map information above 5 MPH but have full functionality below that speed. In this example, a rule can be to limit the UI to displaying and interactive map above 5 MPH. As a second example, a county can have an ordinance that allows only emergency or hands-free interaction with a UE when the UE is in a moving vehicle. In this example, a rule can be that when within the county and where vehicle class motion is determined, the UE can operate in hands-free mode and allow non-hands-free emergency calls (e.g., 911, or similar) until a pedestrian motion class is determined, the UE has been stationary for 60 seconds, or the UE is no longer in the county. One of skill in the art will appreciate that rules can be of any level of sophistication without departing from the scope of the presently disclosed subject matter. Further, it will be appreciated that rules can be employed as individual elements to form more complex decision making processes within the scope of the present disclosure.

In an aspect, user interfaces can include access to applications, such as by way of an icon on a smartphone, a dedicated key on device keypad, etc. MA component 110 can determine interaction with these applications at the UI level. MA component 110 can access one or more indicators related to interaction with applications. For example, a flag can be set that an application can or cannot be accessed based on the motion of the UE. As such, it is envisioned that applications can include one or more components that interact with the presently disclosed subject matter, for example by accessing the one or more indicators, as part of being compliant with said disclosed subject matter. Thus, as a non-limiting example, a voice recorder application, "VoiceApp", can include support to check for a motion permission to operate. As such, when a UE is in motion, MA component 110 can specify that "VoiceApp" is not allowed to operate. Therefore, when the UE is in motion and a user attempts to active the "VoiceApp" application, the application can refuse to open based on the designation of MA component 110. It is further envisioned that motion permissions can include partial operation, no operation, full operation, operation dependant on other metrics, etc., without departing from the scope of the subject disclosure. One of skill in the art will appreciate that the term "application" is employed in this paragraph as a general term to represent programs, software applications, etc., that can reside and/or execute, in whole or in part, on a UE.

Figure 2:
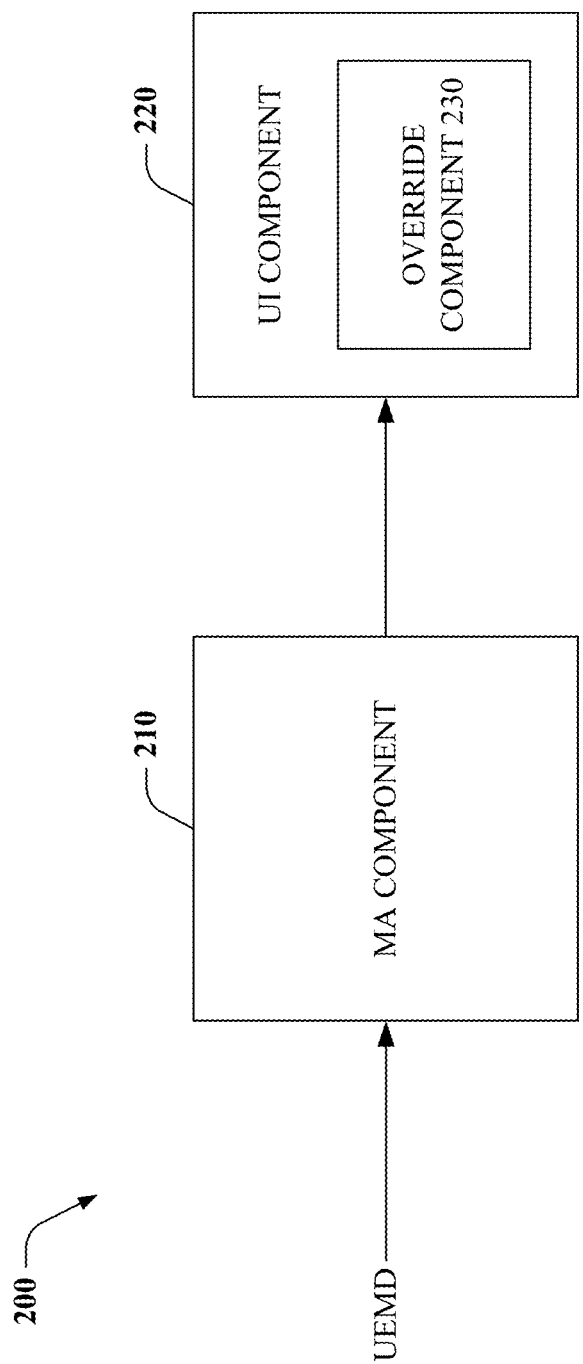
FIG. 2 is a block diagram illustrating a system that can employ motion-based user interface feature subsets in accordance with aspects of the disclosed subject matter.

FIG. 2 is a block diagram of a system 200 that can employ motion-based user interface feature subsets in accordance with aspects of the disclosed subject matter. System 200 can include MA component 210. MA component 210 can be the same as, or similar to, MA component 110. MA component 210 can access UEMD. MA component 210 can analyze UEMD to determine the motion of a UE. MA component 210 can further determine one or more subsets of UI features that can be made accessible by way of the UE based, at least in part, on the motion of the UE.

System 200 can further include UI component 220. UI component 220 can access subset information determined by MA component 210. UI component 220 can selectively make available features of a UI in accord with the one or more subsets of UI features as determined by MA component 210.

In an aspect, UI component 220 can comprise override component 230. Override component 230 can allow an override of the limited or disabled UI functions. That is, an override condition can result in allowing UI functionality that would otherwise be disabled or limited due to UE motion. As a non-limiting example, an override can allow a passenger to operate a moving UE without limitation, e.g., a passenger in a vehicle can operate a UE in a different UI functional capacity than a driver of a vehicle where the passenger can provide the override and the driver cannot. The particular override is beyond the scope of the present disclosure, however one of skill in the art will appreciate that the presently described subject matter is capable of accessing overrides to provide override functionality. In an aspect, override component 230 can provide for an override hook in a software development environment to allow inclusion of override functionality in UE software.

As a non-limiting example, system 200 can be configured to limit a UI to allow only outgoing emergency calls when moving at more than 20 MPH to prevent a user from operating the UE while driving. Where the exemplary UE is moving at 30 MPH the UI can be limited to outgoing emergency calls only. However, where the exemplary UE is used by a passenger in a vehicle, the prohibition on full UE use can be overridden by providing an override by way of exemplary override component 230. Where, for example, the override is provided by occasionally completing a task that requires high levels of concentration that would be overly burdensome for most vehicle operators, a passenger can have unfettered use of the UE. As such, facilitating an override provides a degree of selectivity that can be important in distinguishing between users that should be burdened and those that should not be burdened by rules relating to the motion of a UE.

Figure 3:
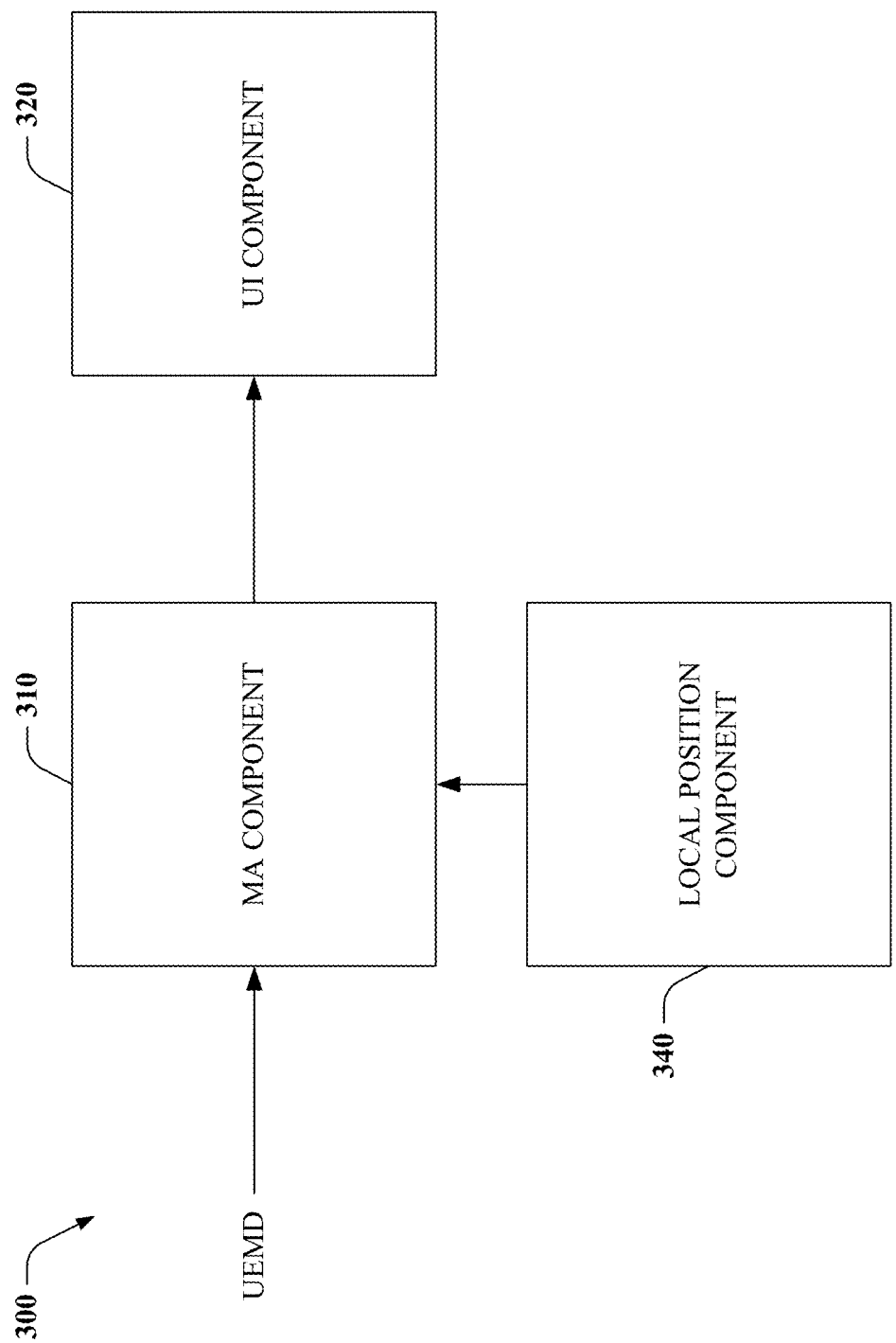
FIG. 3 is a block diagram illustrating a system that can determine motion-based user interface feature subsets in accordance with aspects of the disclosed subject matter.

FIG. 3 is a block diagram of a system 300 that can determine motion-based user interface feature subsets in accordance with aspects of the disclosed subject matter. System 300 can be the same as, or similar to, system 100 or 200. System 300 can include MA component 310 and UI component 320, which can be the same as, or similar to, the corresponding components of system 100 or 200. System 300 can further include local position component 340. Local position component 340 can facilitate auxiliary determination of position. The auxiliary determination of UE position can be beneficial in determining the one or more subsets of UI functions to make accessible by way of a UE. This local position data can be auxiliary or supplementary location information to UEMD, including TFL data and TFL for idle-state data. As a non-limiting example, a local position component can access a UE camera to determine that the UE is likely located in the passenger portion of a vehicle rather than in the operator portion of the vehicle. As a second non-limiting example, a local position component can access RFID tags in a vehicle to determine position within a vehicle. One of skill in the art will appreciate that various systems and techniques can be employed in an auxiliary determination of UE position and that all such systems and techniques are within the scope of the subject disclosure.

The auxiliary determination of position can be employed in conjunction with motion determinations when further determining one or more subsets of UI functions to make available. As a non-limiting example, where a UE camera is employed by local position component 340 to determine that the UE is most likely in the passenger area of a vehicle, a different subset of UI functions can be made available by MA component 310 than if local position component 340 determined the UE was most likely in the operator position of a vehicle. As such, despite a UE moving as a speed that would otherwise limit the UI functionality, the position of the UE within the frame of movement can provide information that can be employed to allow a different level of UI functionality. As a further non-limiting example, a vehicle operator positioned UE in motion can be limited to emergency calls only, while a passenger positioned UE in motion can be limited to emergency calls and incoming calls only, while a UE not in motion can be allowed full UI functionality.

Figure 4:
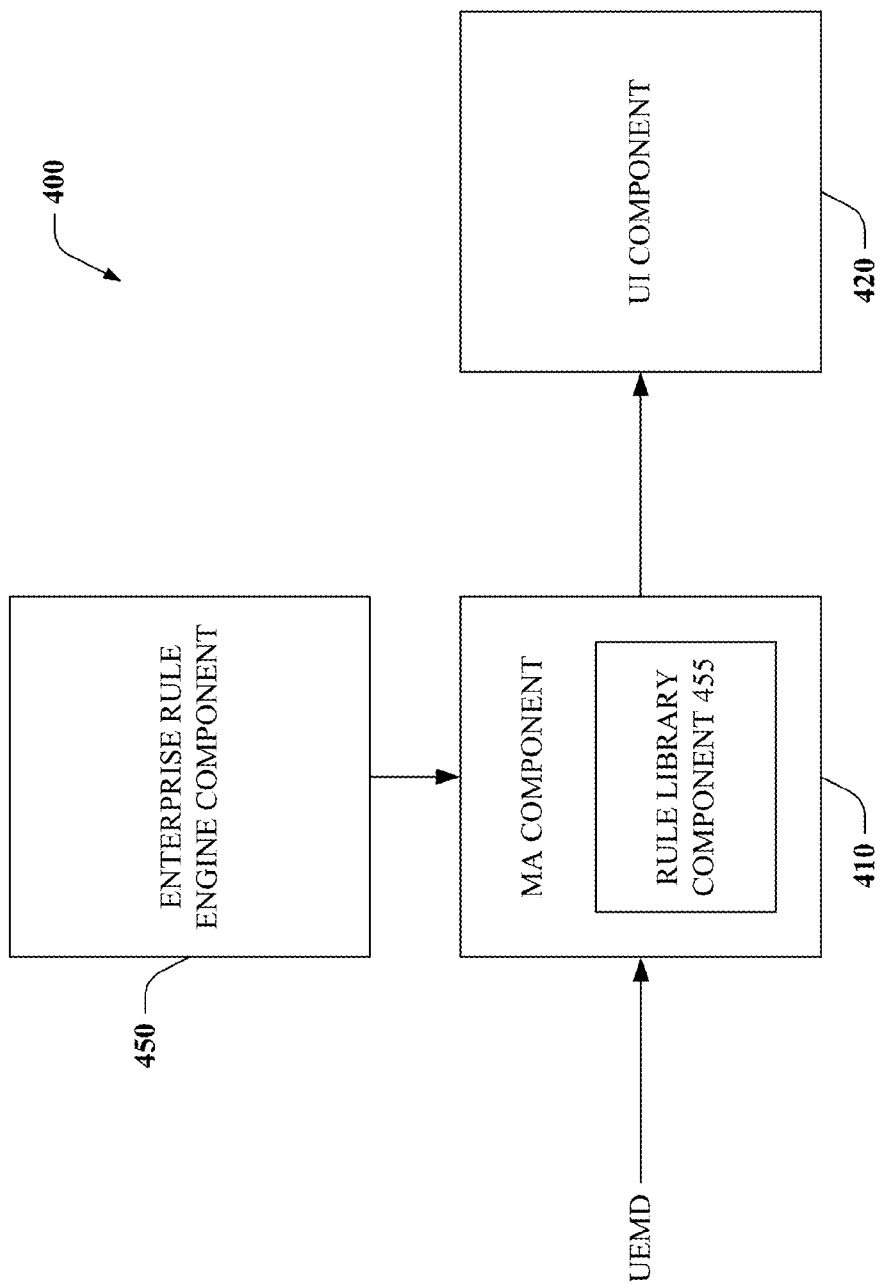
FIG. 4 is a block diagram illustrating a system that can update motion-based user interface feature subset determination rules in accordance with aspects of the disclosed subject matter.

FIG. 4 is a block diagram of a system 400 that can update motion-based user interface feature subset determination rules in accordance with aspects of the disclosed subject matter. System 400 can be the same as, or similar to, system 100, 200, or 300. System 400 can include MA component 410 and UI component 420, which can be the same as, or similar to, the corresponding components of system 100, 200 or 300. System 400 can further include enterprise rule engine component 450. Enterprise rule engine component 450 can facilitate access to one or more motion rules. In an aspect, enterprise rule engine component 450 can generate one or more motion rules. These motion rules can be related to goals of the enterprise. As a non-limiting example, a goal of an enterprise can be to comply with ordinances related to UE usage in vehicles or standards related to worker safety. As such, the exemplary enterprise rule engine component 450 can generate one or more motion rules reflective of the goals of the enterprise, for example, a rule can designate that a UI is disabled above 25 MPH in a first county and disabled above 5 MPH in a second county in compliance with the ordinances of the first and second counties.

System 400 can further include rule library component 455. Rule library component 455 can be a rule store. As a non-limiting example, rule library component 455 can be a local rule database. In an aspect, rule library component 455 can store one or more motion rules. In a further aspect, rule library component 455 can update the one or more rules stored therein. Motion rules can be accessed by rule library component 455 by way of enterprise rule engine component 450. As such enterprise rule engine component 450 can facilitate generating and updating motion rules associated with rule library component 455.

Motion rules associated with rule library component 455 can be employed in determinations made by MA component 410. As such, where motion rules change relative to UE scope, the motion rules can be updated to remain relevant. As a non-limiting example, rule library component 455 can facilitate access to California motion rules for a corporate issued UE. Where the corporate issued UE travels with an employee-user to Virginia, rule library component 455 can access Virginia motion rules. Access to the exemplary Virginia motion rules can be facilitated by enterprise rule engine component 450. For example, enterprise rule engine component 450 can generate a Virginia-centric set of motion rules that are also compliant with motion rules of the corporate owner of the UE. One of skill in the art will appreciate that updating motion rules can provide additional desirable functionality to systems like system 400 and that all such systems or techniques for storing, updating, and generating motion rules are within the scope of the present disclosure.

Figure 5:
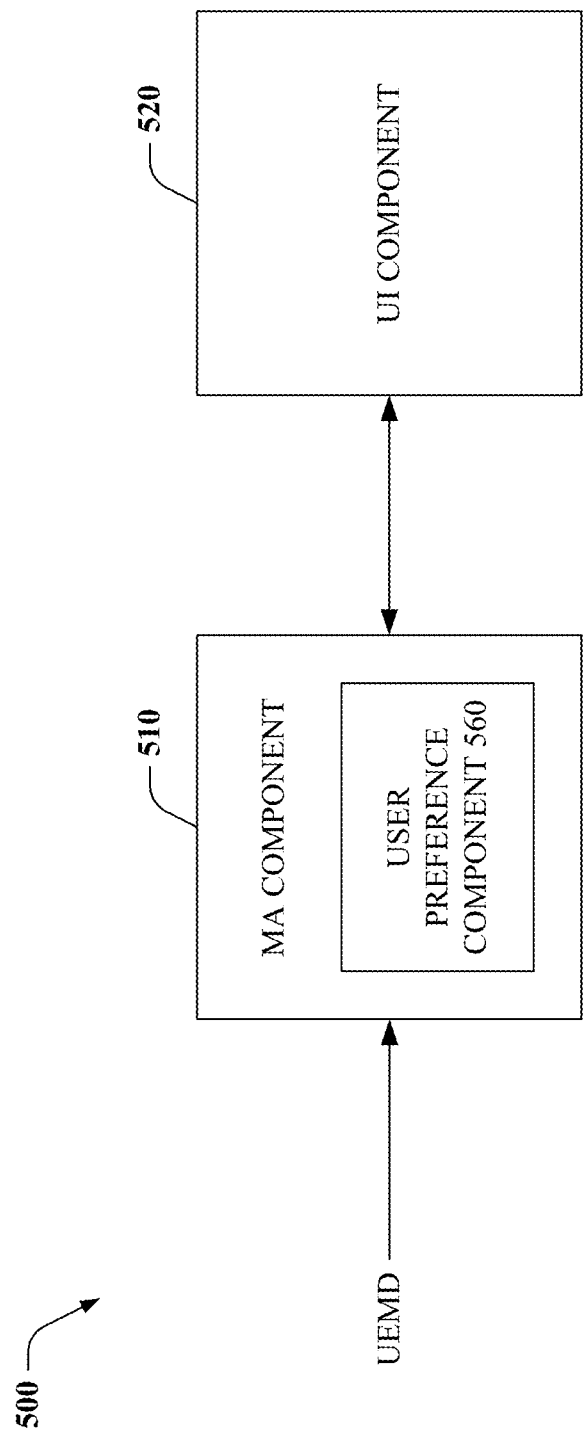
FIG. 5 is a block diagram illustrating a system that can determine motion-based user interface feature subsets in accordance with aspects of the disclosed subject matter.

FIG. 5 is a block diagram of a system 500 that can determine motion-based user interface feature subsets in accordance with aspects of the disclosed subject matter. System 500 can be the same as, or similar to, system 100, 200, 300, or 400. System 500 can include MA component 510 and UI component 520 which can be the same as, or similar to, the corresponding components of system 100, 200, 300 or 400. System 500 can further comprise user preference component 560. User preference component 560 can facilitate access to one or more user preferences related to motion rules. In an aspect, user preferences can comprise voluntary and involuntary user preferences. Voluntary user preferences can be those preferences indicated by a user. Involuntary user preferences can be those preferences indicated for a user. As a non-limiting example, a voluntary user preference can be indicated by "child 1" for "child 1" while an involuntary user preference can be indicated by "parent 1" for "child 1". As a second non-limiting example, a voluntary user preference can be indicated by "employee 1" for "employee 1" while an involuntary user preference can be indicated by "supervisor 1" for "employee 1". Thus for example, "child 1" can indicate that access to entertainment applications is limited while driving and "parent 1" can indicate that access to social media applications is limited while "child 1" is driving.

In an aspect, user preference component 560 can facilitate tiered motion rules for various users. Each user can comprise a particular combination of motion rules in light of one or more levels of voluntary and/or involuntary user preferences. As a non-limiting example, a user preference component can facilitate access to a user profile including motion rules from "employee 1", the employee's direct supervisor, and the employee's regional director. Other permutations of user preference tiers are readily envisioned and one of skill in the art will appreciate that all such permutations are within the scope of the subject disclosure.

In view of the example system(s) described above, example method(s) that can be implemented in accordance with the disclosed subject matter can be better appreciated with reference to flowcharts in FIG. 6 through FIG. 11. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 6:
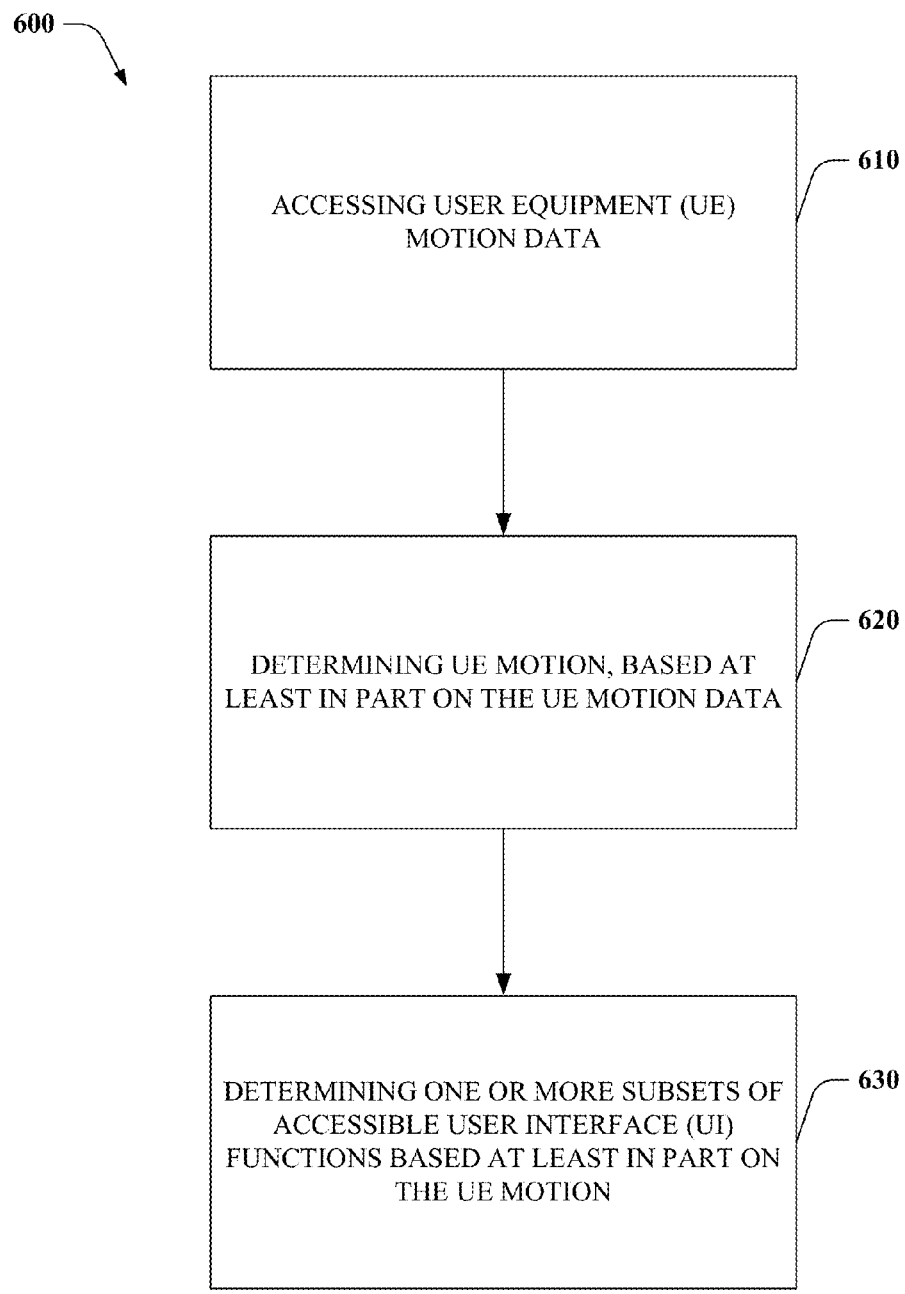
FIG. 6 is an exemplary flowchart of procedures defining a method for determining at least a subset of accessible user interface functions in accordance with aspects of the disclosed subject matter.

FIG. 6 is exemplary flowchart of procedures defining a method 600 for determining at least a subset of accessible user interface functions in accordance with aspects of the disclosed subject matter. At 610 of method 600, user equipment motion data (UEMD) can be accessed. UEMD can include timed fingerprint locating (TFL) or TFL for idle-state UEs as disclosed in the related applications. UEMD can relate to the position, speed, acceleration, velocity, direction, magnitude, etc. of a UE. As such, at 620, the motion of a UE can be determined based, at least in part, on the UEMD. For example, where the location of a UE is given at two points in time by TFL data or TFL for idle-state data, the change in location over the change in time can be related to the motion, e.g., the speed, of the UE.

At 630, one or more subsets of user interface functions can be determined based, at least in part, on the UE motion determination from 620. It should be noted that a subset can include all, some, or none of a superset, and as such, a subset of user interface functions can include all UI functions, some UI functions, or no UI functions. At this point method 600 can end.

As a non-limiting example, a first UI function subset can include all UI functions, a second UI function subset can include all telephone keypad functions, a third UI function subset can include only UI functions for dialing "9-1-1" (or other emergency numbers), etc. Thus, based on the motion of a UE, different functionality can be made available to a user through the UI by determining which subset(s) of UI functions are accessible. As a non-limiting example, when a UE is moving at more than 20 MPH, only UI functions for dialing "9-1-1" can be allowed. One of skill in the art will appreciate that numerous other examples of accessible UI functions are possible and that all such examples are within the scope of the present disclosure.

Figure 7:
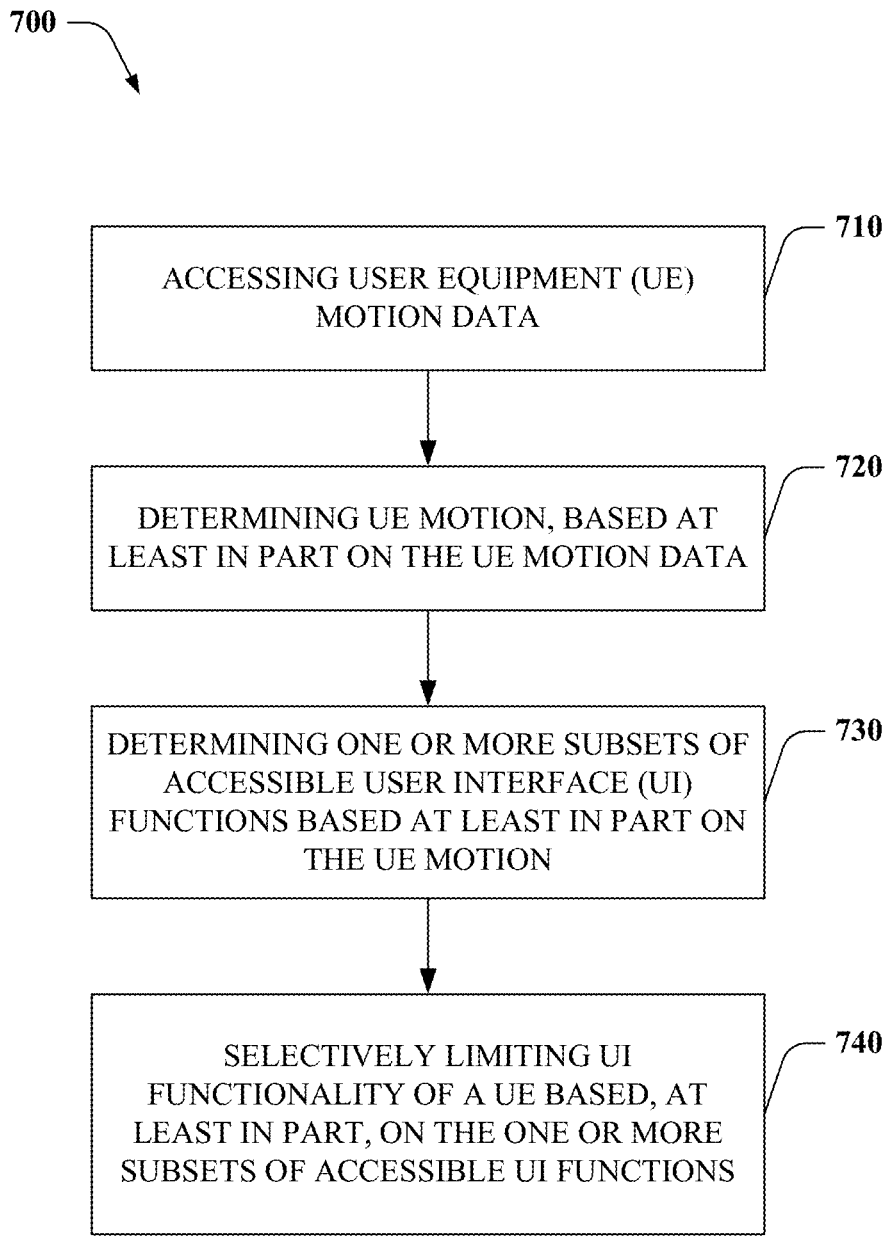
FIG. 7 is an exemplary flowchart of procedures defining a method for selectively limiting the functionality of a UE based, at least in part, on a subset of accessible user interface functions in accordance with aspects of the disclosed subject matter.

FIG. 7 is an exemplary flowchart of procedures defining a method 700 for selectively limiting the functionality of a UE based, at least in part, on a subset of accessible user interface functions in accordance with aspects of the disclosed subject matter. At 710, UEMD can be accessed. At 720, UE motion can be determined based on UEMD from 710. At 730 one or more subsets of accessible UI functions can be determined based, at least in part, on the UE motion from 720. At 740, the UI of a UE can be selectively limited based, at least in part, on the one or more subsets of accessible UI functions determined at 730. At this point method 700 can end.

Figure 8:
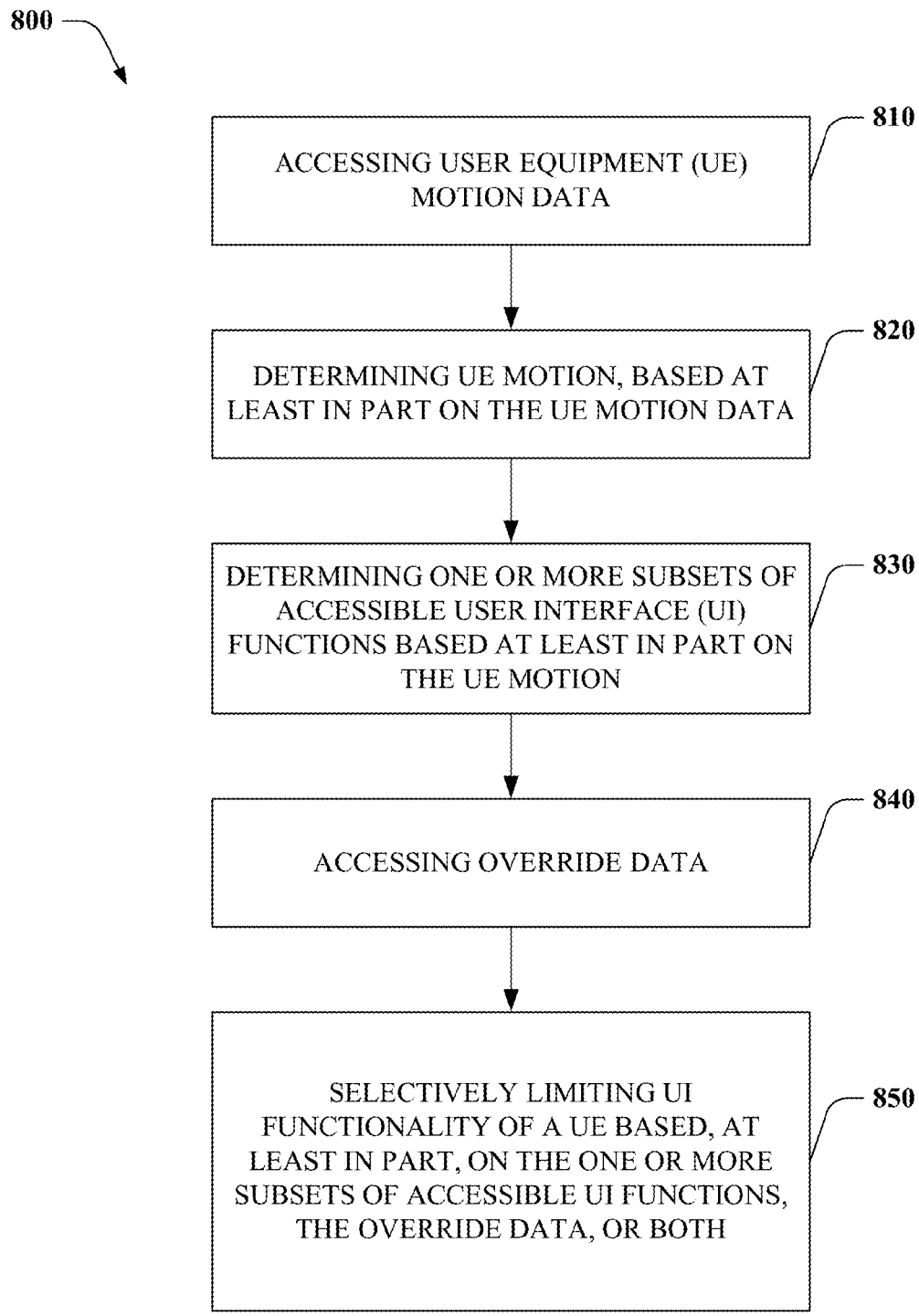
FIG. 8 is an exemplary flowchart of procedures defining a method for selectively limiting the functionality of a UE based, at least in part, on a subset of accessible user interface functions in accordance with aspects of the disclosed subject matter.

FIG. 8 is an exemplary flowchart of procedures defining a method 800 for selectively limiting the functionality of a UE based, at least in part, on a subset of accessible user interface functions in accordance with aspects of the disclosed subject matter. At 810, UEMD can be accessed. At 820, UE motion can be determined based on UEMD from 810. At 830, one or more subsets of accessible UI functions can be determined based, at least in part, on the UE motion from 820.

At 840, override data can be accessed. Override data can be one or more indicators of an override condition as disclosed supra. For example, an override condition can exist where a motion rule as applied would result in UI limitations inconsistent with the intent of the motion rule, such as, limiting vehicle passenger use of a UE when the intent of the motion rule is to limit vehicle operator use of the UE. At 850, the UI of a UE can be selectively limited based, at least in part, on the one or more subsets of accessible UI functions determined at 830, the override data accessed at 840, or both. As a non-limiting example, an override condition can result in no limitation being placed on the UI of a UE even where the UE experiences motion that would otherwise result in limited UI functionality. At this point method 800 can end.

Figure 9:
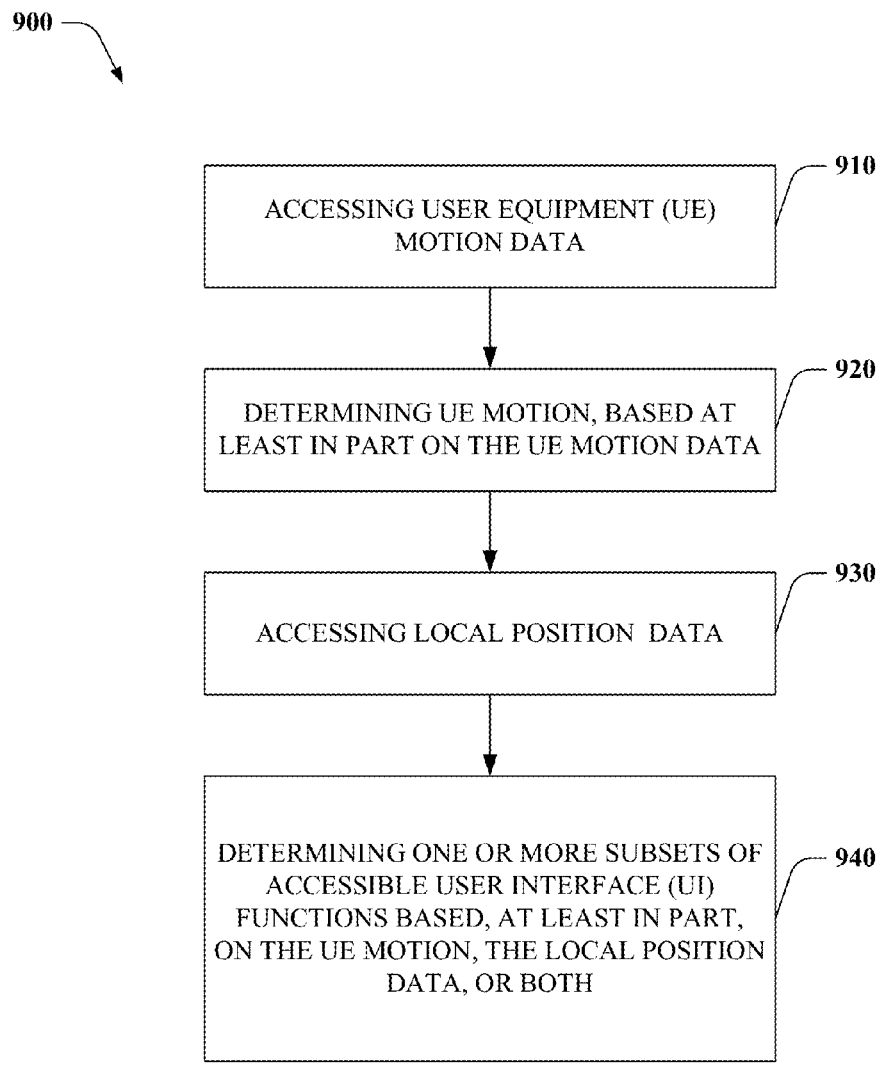
FIG. 9 is an exemplary flowchart of procedures defining a method for determining at least a subset of accessible user interface functions in accordance with aspects of the disclosed subject matter.

FIG. 9 is an exemplary flowchart of procedures defining a method 900 for determining at least a subset of accessible user interface functions in accordance with aspects of the disclosed subject matter. At 910, UEMD can be accessed. At 920, UE motion can be determined based on UEMD from 910. At 930, local position data can be accessed. As disclosed hereinabove, local position data can be auxiliary UE position data that can serve to improve selective application of motion rules to a UE. For example, local position data can be accessed by way of position beacons in a user environment, wherein UE proximity to said position beacon can be employed in determining how to apply motion rules. At 940, one or more subsets of accessible UI functions can be determined based, at least in part, on the UE motion from 920, local position data from 930, or both. At this point method 900 can end.

Figure 10:
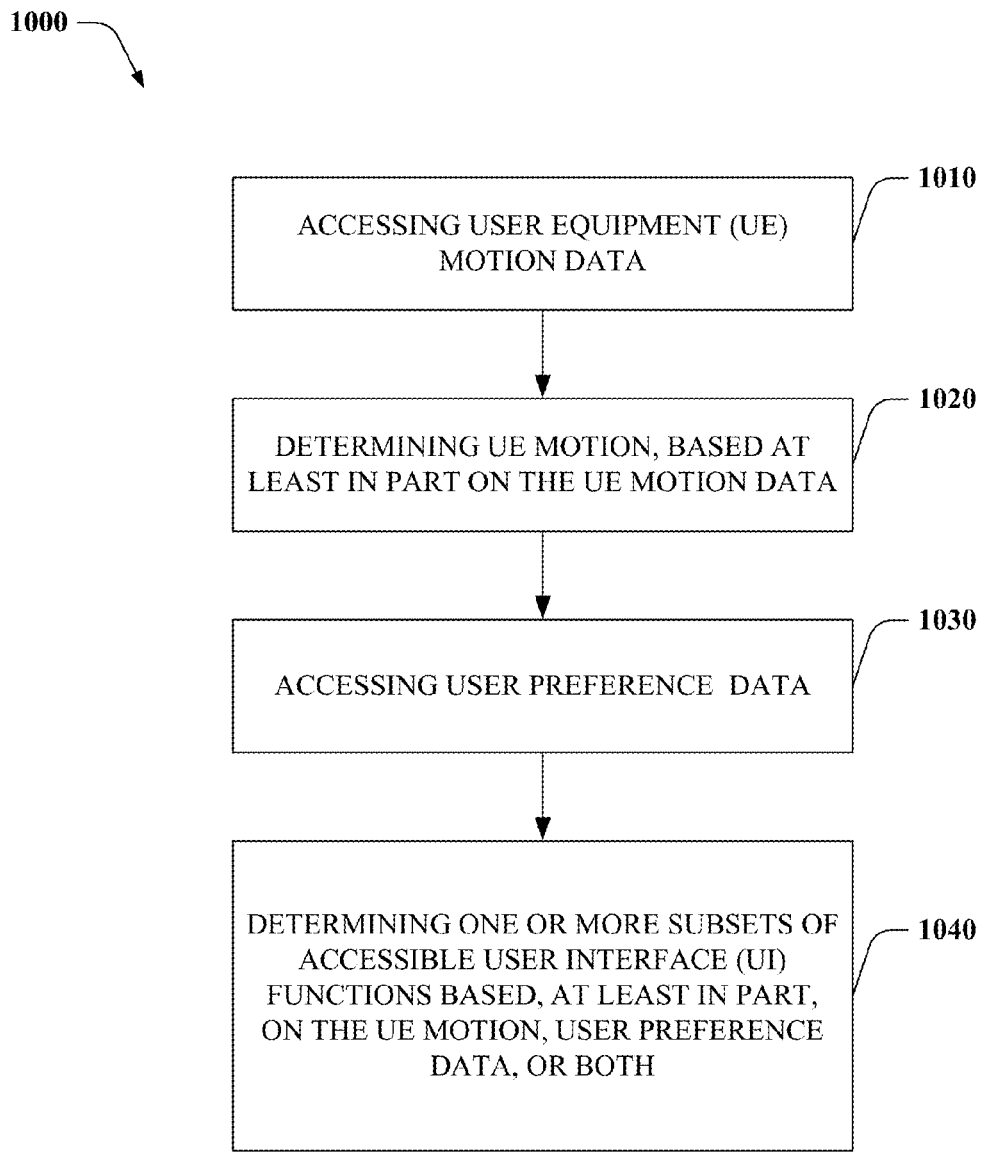
FIG. 10 is an exemplary flowchart of procedures defining a method for determining at least a subset of accessible user interface functions in accordance with aspects of the disclosed subject matter.

FIG. 10 is an exemplary flowchart of procedures defining a method 1000 for determining at least a subset of accessible user interface functions in accordance with aspects of the disclosed subject matter. At 1010, UEMD can be accessed. At 1020, UE motion can be determined based on UEMD from 1010. At 1030, user preference data can be accessed. At 1040, one or more subsets of accessible UI functions can be determined based, at least in part, on the UE motion from 1020, user preference data from 1030, or both. At this point method 1000 can end.

As presently disclosed hereinabove, user preference data can be voluntary or involuntary. Further, as disclosed herein, user preference data can be employed in a tiered or hierarchical form. As such, user preference data can impact what UI functions are made available to a UE. As a non-limiting example, a user preference can indicate that a loud ring tone be employed when a UE is in motion above an indicated speed. As a second non-limiting example, a user preference can indicate that text messages should be queued but not presented by way of the UI until the UE is moving at less than 5 MPH. One of skill in the art will appreciate that nearly unlimited number of combinations of user preference data can be employed and that all such permutations are within the scope of the present disclosure.

Figure 11:
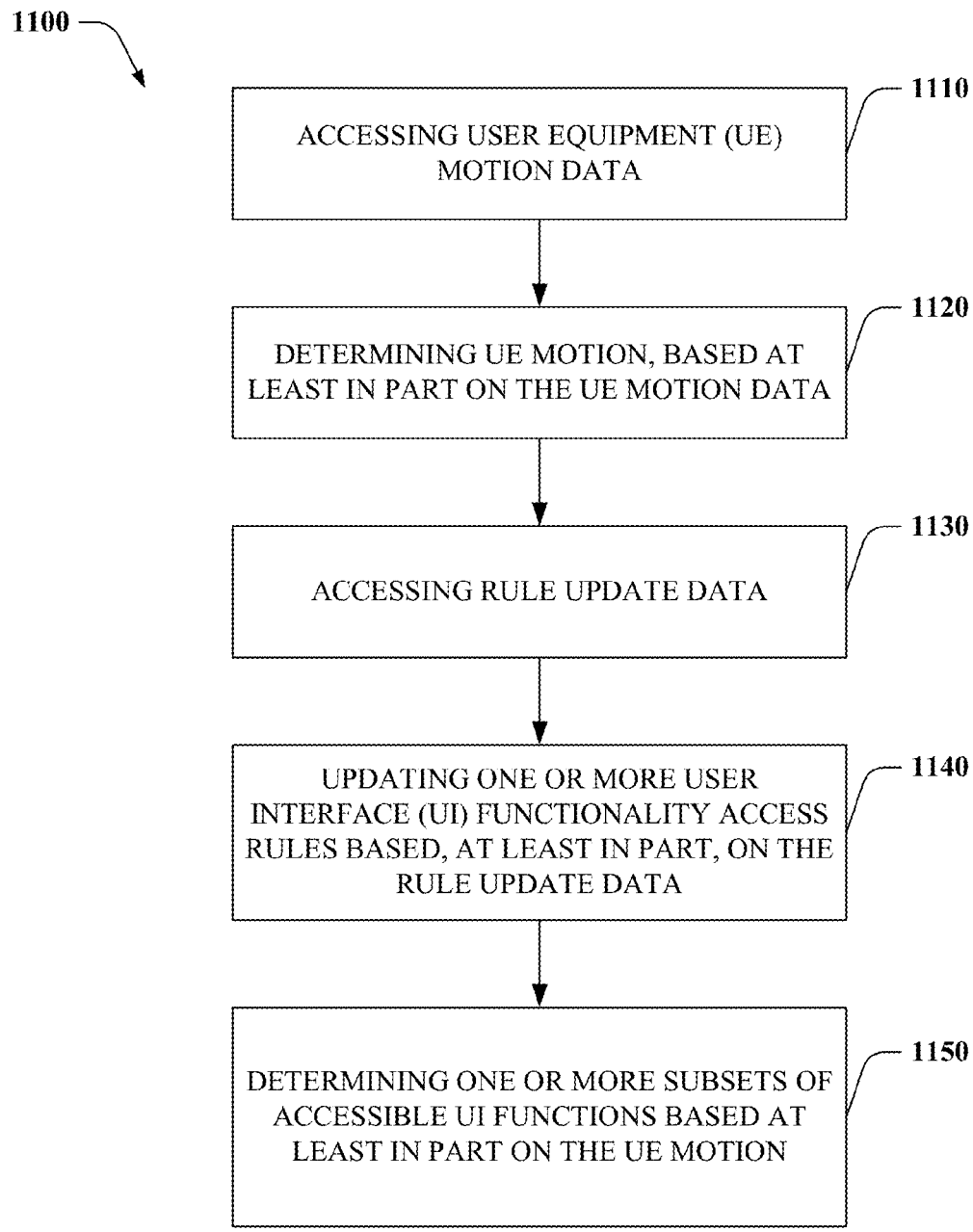
FIG. 11 is an exemplary flowchart of procedures defining a method for determining at least a subset of accessible user interface functions in accordance with aspects of the disclosed subject matter.

FIG. 11 is an exemplary flowchart of procedures defining a method 1100 for determining at least a subset of accessible user interface functions in accordance with aspects of the disclosed subject matter. At 1110, UEMD can be accessed. At 1120, UE motion can be determined based on UEMD from 1110. At 1130, rule update data can be accessed. As disclosed herein, motion rules can be updated dynamically. As such, method 1100 facilitates accessing updated rules. As a non-limiting example, a corporation may update rules for employee UEs. These corporate updates can be accessed at 1130. One of skill in the art will appreciate that many other permutations of access to rule update data remains within the scope of the subject disclosure. At 1140, one or more UI functionality access rules can be updated based, at least in part, on the rule update data accessed at 1130. At 1150, one or more subsets of accessible UI functions can be determined based, at least in part, on the UE motion from 1120. At this point method 1100 can end.

Figure 12:
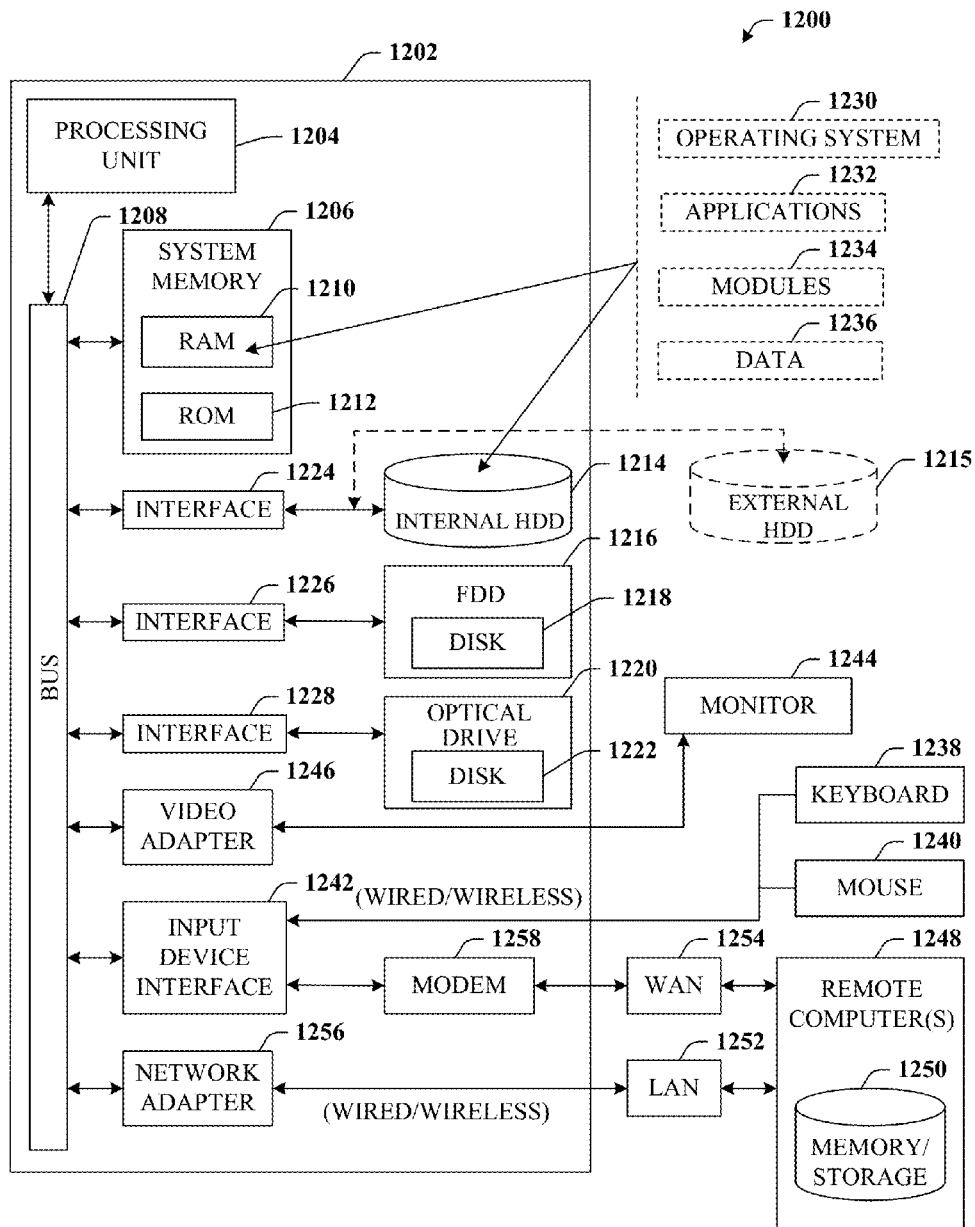
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices. As a non-limiting example, rule library component 455 can be embodied on a UE or can be accessed from a remote computing system, for example, in real time as by way of cloud computing, etc.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214, e.g., EIDE, SATA, which internal hard disk drive 1214 may also be configured for external use in a suitable chassis, e.g., 1215, a magnetic floppy disk drive (FDD) 1216, e.g., to read from or write to a removable diskette 1218, and an optical disk drive 1220, e.g., reading a CD-ROM disk 1222 or, to read from or write to other high capacity optical media such as the DVD. The hard disk drive 1214 (or 1215), magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, e.g., a kiosk, news stand, restroom, etc., and telephone. This includes at least Wi-Fi and Bluetooth wireless technologies. Thus, the communication can be a predefined structure as with a conventional network or simply an ad hoc communication between at least two devices.

Figure 13:
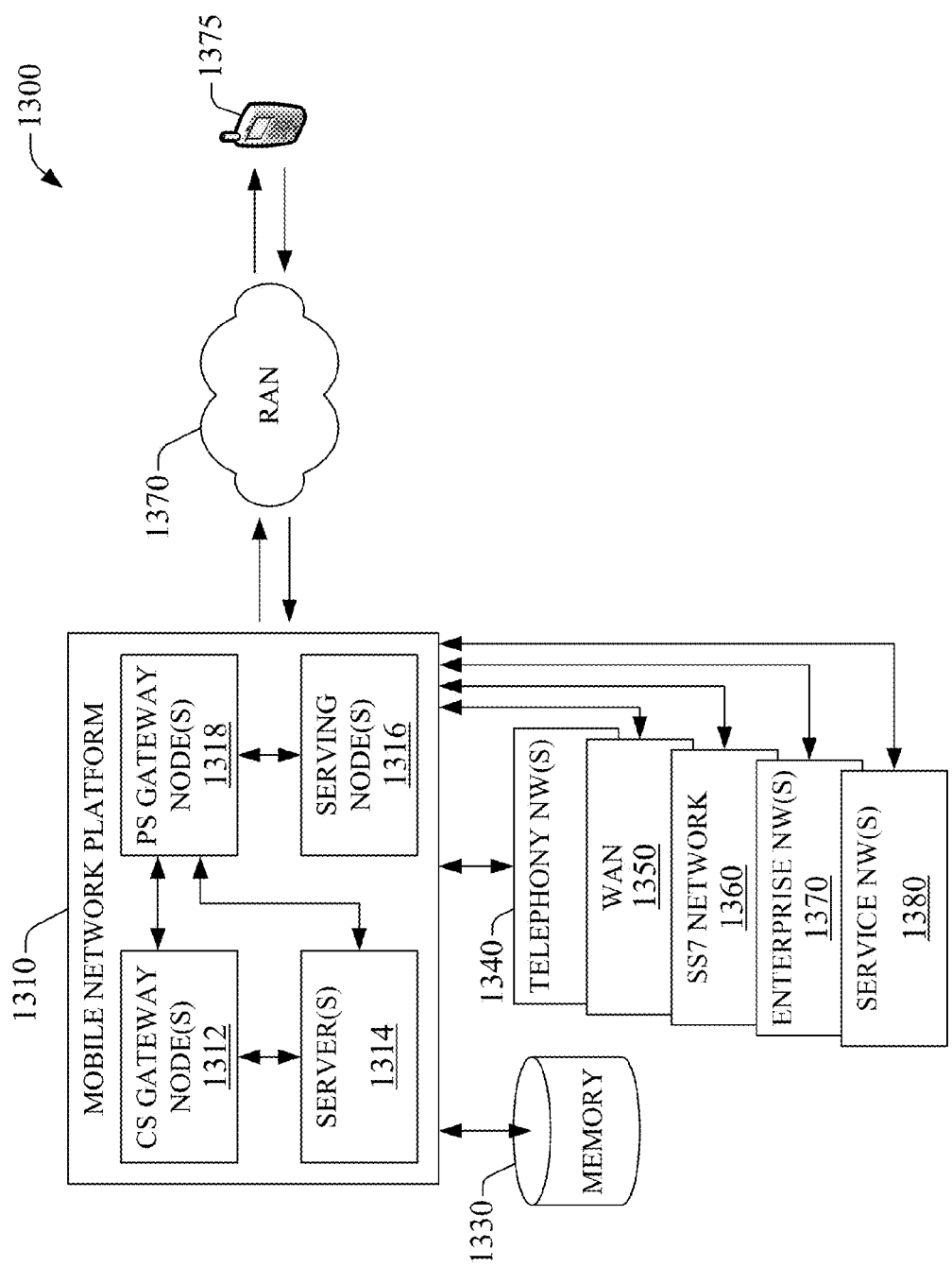
FIG. 13 presents an example embodiment of a mobile network platform 1310 that can implement and exploit one or more aspects of the disclosed subject matter described herein.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In the disclosed subject matter, in addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto cell network(s) (not shown) that enhance wireless service coverage within indoor confined spaces and offload RAN resources in order to enhance subscriber service experience within a home or business environment.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. In particular, memory 1330 can include contents of memory 440 in example system 400. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370.

Figure 14:
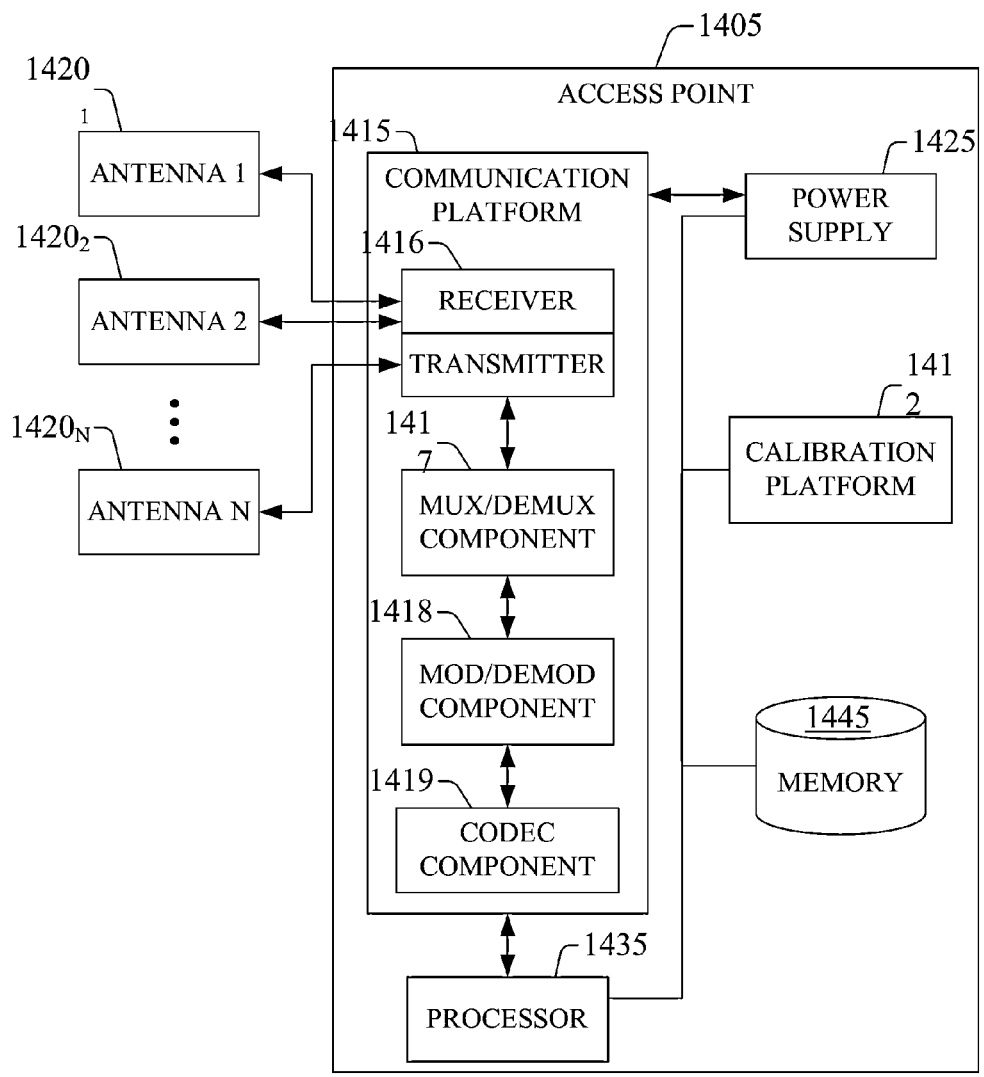
FIG. 14 illustrates a block diagram of an example embodiment of an access point to implement and exploit one or more features or aspects of the disclosed subject matter

FIG. 14 illustrates a block diagram of an example embodiment of an access point to implement and exploit one or more features or aspects of the disclosed subject matter. In embodiment 1400, AP 1405 can receive and transmit signal(s) (e.g., attachment signaling) from and to wireless devices, access terminals, wireless ports and routers, or the like, through a set of antennas $1420_1$-$1420_N$ (N is a positive integer). It should be appreciated that antennas $1420_1$-$1420_N$ embody antenna(s) 432, and are a part of communication platform 1415, which comprises electronic components and associated circuitry that provides for processing and manipulation of received signal(s) and signal(s) to be transmitted. In an aspect, communication platform 1415 includes a receiver/transmitter 1416 that can convert signal (e.g., RL signal 438) from analog to digital upon reception, and from digital to analog upon transmission. In addition, receiver/transmitter 1416 can divide a single data stream into multiple, parallel data streams, or perform the reciprocal operation. Coupled to receiver/transmitter 1416 is a multiplexer/demultiplexer 1417 that facilitates manipulation of signal in time and frequency space. Electronic component 1417 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1417 can scramble and spread information (e.g., codes) according to substantially any code known in the art; e.g., Hadamard-Walsh codes, Baker codes, Kasami codes, polyphase codes, and so on. A modulator/demodulator 1418 is also a part of communication platform 1415, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1415 also includes a coder/decoder (codec) component 1419 that facilitates decoding received signal(s), and coding signal(s) to convey.

Access point 1405 also includes a processor 1435 configured to confer functionality, at least in part, to substantially any electronic component in AP 1405. In particular, processor 1435 can facilitate determination of propagation delay information of RF signal, or microwave signal, among communication platform 1415 and antennas $1420_1$-$1420_N$ in accordance with various aspects and embodiments disclosed herein. Power supply 1425 can attach to a power grid and include one or more transformers to achieve power level that can operate AP 1405 components and circuitry. Additionally, power supply 1425 can include a rechargeable power component to ensure operation when AP 1405 is disconnected from the power grid, or in instances, the power grid is not operating.

Processor 1435 also is functionally connected to communication platform 1415 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1435 is functionally connected, via a data or system bus, to calibration platform 1412 and other components (not shown) to confer, at least in part functionality to each of such components.

In AP 1405, memory 1445 can store data structures, code instructions and program modules, system or device information, code sequences for scrambling, spreading and pilot transmission, location intelligence storage, determined delay offset(s), over-the-air propagation models, and so on. Processor 1435 is coupled to the memory 1445 in order to store and retrieve information necessary to operate and/or confer functionality to communication platform 1415, calibration platform 1412, and other components (not shown) of access point 1405.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets, e.g., data from one component interacting with another component in a local system, distributed system, and/or across a network such as the Internet with other systems via the signal. As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile device," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence, e.g., a capacity to make inference based on complex mathematical formalisms, which can provide simulated vision, sound recognition and so forth.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

The term "article of manufacture" as used herein is intended to encompass a computer program accessible from any computer-readable device or media. Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
    a memory to store executable instructions; and
    a processor, coupled to the memory, that facilitates execution of the executable instructions to perform operations, comprising:
        determining an overlapping region between a first geographic location region and a second geographic location region in response to receiving timed fingerprint location information based on a first differential timing measurement for a first NodeB site pair and a second differential timing measurement for a second NodeB site pair, wherein the first differential timing measurement is correlated to a first geographic location region and the second differential timing measurement is correlated to a second geographic location region, and wherein the first and second differential timing measurements are stored as part of the timed fingerprint location information to enable determining a location of the user equipment based on querying a data store device storing the timed fingerprint location information to enable the determining the overlapping region between the first geographic location region and the second geographic location region; and
        determining a set of accessible user interface functions of the user equipment based on the overlapping region being determined to satisfy a condition related to a motion of the user equipment.

2. The system of claim 1, wherein the operations further comprise determining an override state based on receiving a user input.

3. The system of claim 2, wherein the determining the set of accessible user interface functions is further based on the override state.

4. The system of claim 1, wherein the operations further comprise receiving secondary position information for a local environment from the user equipment.

5. The system of claim 4, wherein the determining the set of accessible user interface functions is further based on the secondary position information.

6. The system of claim 4, wherein the secondary position information is associated with a position of the user equipment determined with regard to a reference location of the local environment.

7. The system of claim 1, wherein the operations further comprise receiving a rule related to the determining the set of accessible user interface functions.

8. The system of claim 1, wherein the operations further comprise generating a rule related to the determining the set of accessible user interface functions.

9. The system of claim 1, wherein the operations further comprise accessing user preference information from a data store.

10. The system of claim 9, wherein the user preference information represents a user preference associated with a user identity that is generated by input associated with an entity other than a user associated with the user identity.

11. The system of claim 9, wherein the user preference information represents a user preference associated with a user identity, and the user preference is generated based on input associated with the user identity.

12. A method, comprising:
    identifying, by a system comprising a processor, an overlapping region between a first geographic location region and a second geographic location region in response to receiving mobile device motion information, the mobile device motion information comprising timed fingerprint location information based on a first differential timing measurement for a first NodeB site pair and a second differential timing measurement for a second NodeB site pair, wherein the first differential timing measurement is correlated to a first geographic location region and the second differential timing measurement is correlated to a second geographic location region, and wherein the first and second differential timing measurements are stored as part of the timed fingerprint location information to enable the identifying the overlapping region between the first geographic location region and the second geographic location region based on the first and second differential timing measurements; and
    selecting, by the system, accessible user interface functions of the mobile device based on the overlapping region.

13. The method of claim 12, further comprising determining, by the system, a limit to a function of a user interface of the mobile device based on the accessible user interface functions.

14. The method of claim 12, further comprising:
    receiving, by the system, override information related to an override condition; and
    determining, by the system, a limit to a function of a user interface of the mobile device based on the override information.

15. The method of claim 12, further comprising:
    receiving, by the system, position information associated with a position of the mobile device relative to a local reference position that remains for a period of time substantially local to the mobile device; and
    limiting, by the system, a functionality of a user interface of the mobile device based on the position information.

16. The method of claim 12, further comprising:
    receiving, by the system, user preference information; and
    limiting, by the system, a functionality of a user interface of the mobile device based on the user preference information.

17. The method of claim 16, wherein the limiting comprises limiting of the functionality based on preference data determined to be associated with a user identity and based on input received for the user identity.

18. The method of claim 16, wherein the limiting comprises limiting of the functionality based on preference data determined to be associated with a user identity and determined for the user identity from input associated with an entity other than a user associated with the user identity.

19. A non-transitory computer-readable medium having instructions stored thereon that, in response to execution, cause a system comprising a processor to perform operations, comprising:
    determining a location region based on an overlap between a first geographic region and a second geographic region in response to receiving mobile device motion information comprising timed fingerprint location information associated with a mobile device, wherein the timed fingerprint location information is based on a first differential timing measurement for a NodeB site pair and a second differential timing measurement for another NodeB site pair, wherein the first differential timing measurement is correlated to a first geographic region and the second differential timing measurement is correlated to a second geographic region, and wherein the first and second differential timing measurements are stored as part of the timed fingerprint location information to enable the determining the location region from the overlap between the first geographic region and the second geographic region based on the first and second differential timing measurements; and
    determining a user interface function to expose via the mobile device based on the location region.

20. The non-transitory computer-readable medium of claim 19, wherein the determining the user interface function to expose is further based on user preference information associated with a user identity, and wherein the preference is determined from input associated with an entity other than a use associated with the user identity.

* * * * *